United States Patent [19]

Inoue et al.

[11] Patent Number: 4,613,962
[45] Date of Patent: Sep. 23, 1986

[54] TRACKING DEVICE WITH LINEAR MOTOR

[75] Inventors: Yukio Inoue, Ichikawa; Katsumi Mizunoe, Kawasaki, both of Japan

[73] Assignee: Nippon Kogaku K.K., Tokyo, Japan

[21] Appl. No.: 539,469

[22] Filed: Oct. 6, 1983

[30] Foreign Application Priority Data

Oct. 12, 1982 [JP] Japan ................. 57-178676

[51] Int. Cl.⁴ .......................... G11B 7/00; G11B 21/02
[52] U.S. Cl. ........................................ 369/44; 369/57;
369/98; 369/219; 74/25; 360/101; 360/107;
318/135; 318/254; 318/695; 318/696
[58] Field of Search ................. 369/32, 33, 41, 43–46,
369/50, 56, 57, 98, 215, 219; 360/75, 77, 78,
106, 101, 107; 74/25; 318/695, 696, 138, 254,
135

[56] References Cited

U.S. PATENT DOCUMENTS

| | | | |
|---|---|---|---|
| Re. 30,118 | 10/1979 | Halfhill et al. | 360/106 X |
| 4,034,613 | 7/1977 | Halfhill et al. | 74/25 |
| 4,322,840 | 3/1982 | Kusaka | 369/220 |

Primary Examiner—Robert L. Richardson
Attorney, Agent, or Firm—Shapiro and Shapiro

[57] ABSTRACT

A device for tracking a movable body along a linear path parallel to a plane includes a linear motor for driving the body along the linear path. The body is mounted, as by rollers, for movement along a guide, such as a pair of parallel guide rails, supported on a base which also supports the motor. To enhance stability of the body during tracking movement, the rollers or other mounts for the body are urged against the guide by the magnetic action of a flux which is separate from the principal flux used to generate thrust for the linear motor and which provides an attractive force against preferably a pair of members, such as steel plates, of high magnetic permeability fixed to the movable body.

11 Claims, 7 Drawing Figures

TRACKING DEVICE WITH LINEAR MOTOR

BACKGROUND OF THE INVENTION

1. Field of the Invention

This invention relates to a tracking device provided with a linear motor, and, more particularly, it is concerned with a device for reciprocally moving a head radially along a disc-shaped record carrier to record and/or reproduce image information on the carrier.

2. Description of Prior Art

In an information and recording and playback device, particularly, a photo-disc device which records and reproduces information on a disc-shaped record carrier by use of optical means, an optical head, records and reproduces information signals to and from the record disc with high density. The optical head functions to form pits in the surface of the disc or to read out those pits already formed in the disc surface by irradiation of a light ray onto the disc while it is turning on a turntable. With a view to enabling recording and reproducing of the information to be effected over the entire annular recorded region on the disc, the range of tracking of the optical head is required to extend over a long stroke corresponding to a radius of the disc. Further, in order to enable a rapid access to the recorded contents to be performed, the optical head is required to be moved at a high speed.

In addition to the above, in an ordinary photo-disc device, since a pit to be formed on the surface of the disc has a width of approximately 1 $\mu$m, and a track has a pitch of approximately 2 $\mu$m, it becomes a serious problem in the tracking of the optical head to avoid various mechanical errors such as deflections, vibrations, and so forth so as to achieve precise formation of the pits and accurate reading of the recorded information.

For desired tracking operations of the optical head, there has heretofore been used a system, in which the optical head is subjected to linear tracking operation in the radial direction of the disc by means of a driving device utilizing a linear motor.

FIG. 1 of the accompanying drawing illustrates a conventional device for the linear tracking of the optical head. A slider, on which the optical head is mounted, comprises a frame 1 constructed with four planar members 1A, 1B, 1C and 1D, a pair of rollers 2, 3 fixed on the inner surface of the frame 1, another pair of rollers 4, 5 resiliently fixed on the inner surface of the frame 1, and a winding 6 which is wound in a cylindrical form in the direction normal to the plane of the drawing. A yoke 7 passes through the inside of this cylindrical winding 6, while permanent magnets 8, 9 are disposed in mutual confrontation outside the winding 6 and in parallel with the yoke 7. Outside these permanent magnets, there are fixedly provided yokes 10, 11. These yokes 7, 10, 11 and the permanent magnets 8, 9 all have sufficient length in the direction normal to the drawing sheet, and constitute a linear motor together with the winding 6.

The yoke 10 has guide surfaces for the rollers 2, 3 formed in parallel with the surface of the disc (not shown in the drawing), while the yoke 11 has guide surfaces for the rollers 4, 5 with an inclination of 45 degrees with respect to the disc surface. Accordingly, the slider is sustained on the guide surfaces of the yoke 10 by means of the rollers 2, 3, and urged to the guide surfaces of the yoke 11 both upwardly and laterally by the rollers 4, 5.

In this conventional device, four other rollers are provided to roll on each of the guide surfaces, in addition to the above-mentioned four rollers 2 to 5, with the purpose of eliminating the pitching of the slider with respect to its tracking direction.

Since the conventional device is thus made up of a number of constituent parts such as the planar members to form the frame 1 for the slider, the rollers, and so on, the weight of the slider itself increases and its inertial mass becomes large, on account of which the high speed tracking of the optical head is adversely affected. Furthermore, since the slider has eight rollers urged toward the yokes from upper and lower directions, the combined frictional resistance between the rollers and yokes becomes naturally great. This frictional resistance increases when the rolling direction of each of the eight rollers does not accurately coincide, or when the direction of the inclined guide surfaces of the yoke 11 does not accurately coincide with the rolling direction of the rollers 2, 3 rolling on the yoke 10. The increase in the frictional resistance widens the stop position range of the slider to lower precision in positioning of the optical head.

Thus, in the conventional device, the slider is so constructed that it is urged to the guide surfaces of the guide rails from all directions by use of mechanical means to secure the linear tracking of the slider on and along the guide rails. On account of this, precision in the linear tracking of the slider depends strictly on the mechanical precision of each of the guide surfaces and the rollers.

SUMMARY OF THE INVENTION

It is an object of the present invention to provide a tracking device with a linear motor, which has a light weight and simple construction, and which performs highly precise linear tracking motion.

It is another object of the present invention to provide a photo-disc device equipped with an optical head capable of high performance linear tracking by the use of the above-mentioned tracking device.

The tracking device according to the present invention is so constructed that a leakage magnetic flux which does not take part in generation of a thrust force provides a sustaining force for maintaining stability of the slider. A principal magnetic flux to be generated by the permanent magnet means and the electromagnet means of the linear motor produces the thrust force.

Further, the tracking device according to the present invention magnetically holds the slider on the guide means by the use of a slider with a highly permeable member which is attracted by the aforementioned leakage magnetic flux, and makes it possible to simplify the construction of the slider by decreasing dependency of the slider on the mechanical holding expedients.

The tracking device according to the present invention is also applicable as the tracking device for an alignment stage in the field of semiconductor manufacturing devices.

BRIEF DESCRIPTION OF THE DRAWING

FIGS. 2 and 3 illustrate a tracking device of an optical head for a photo-disc device according to a preferred embodiment of the present invention, wherein FIG. 3 is a top plan view of the device, and FIG. 2 is a cross-sectional view of the same taken along a line II—II in FIG. 3;

DESCRIPTION OF PREFERRED EMBODIMENTS

Figure 1:
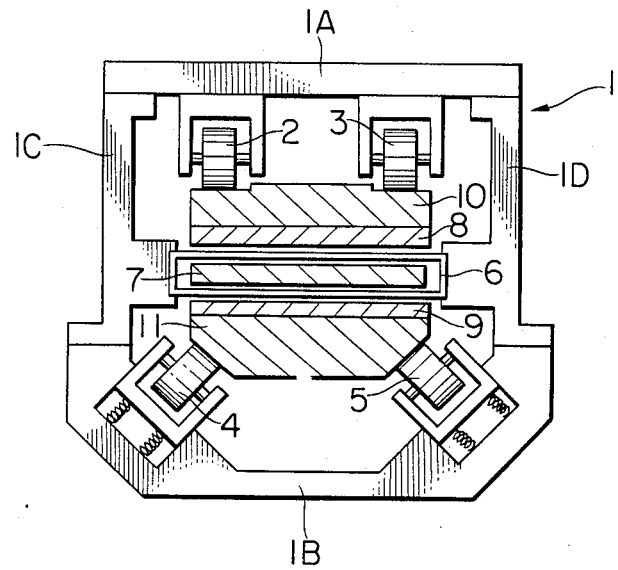
FIG. 1 is a cross-sectional view showing a conventional tracking device.
Figure 2:
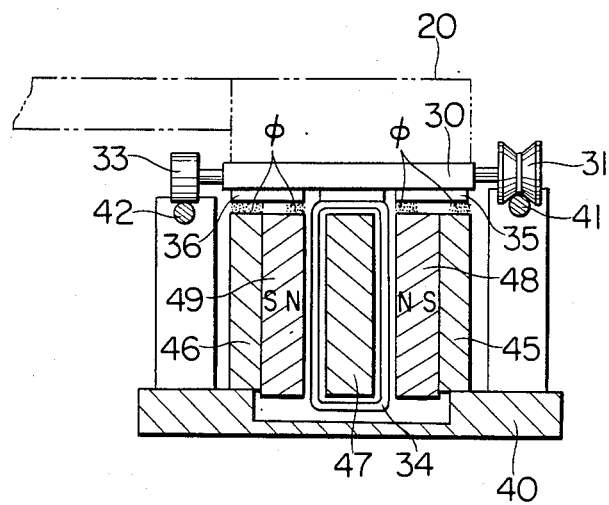
Figure 3:
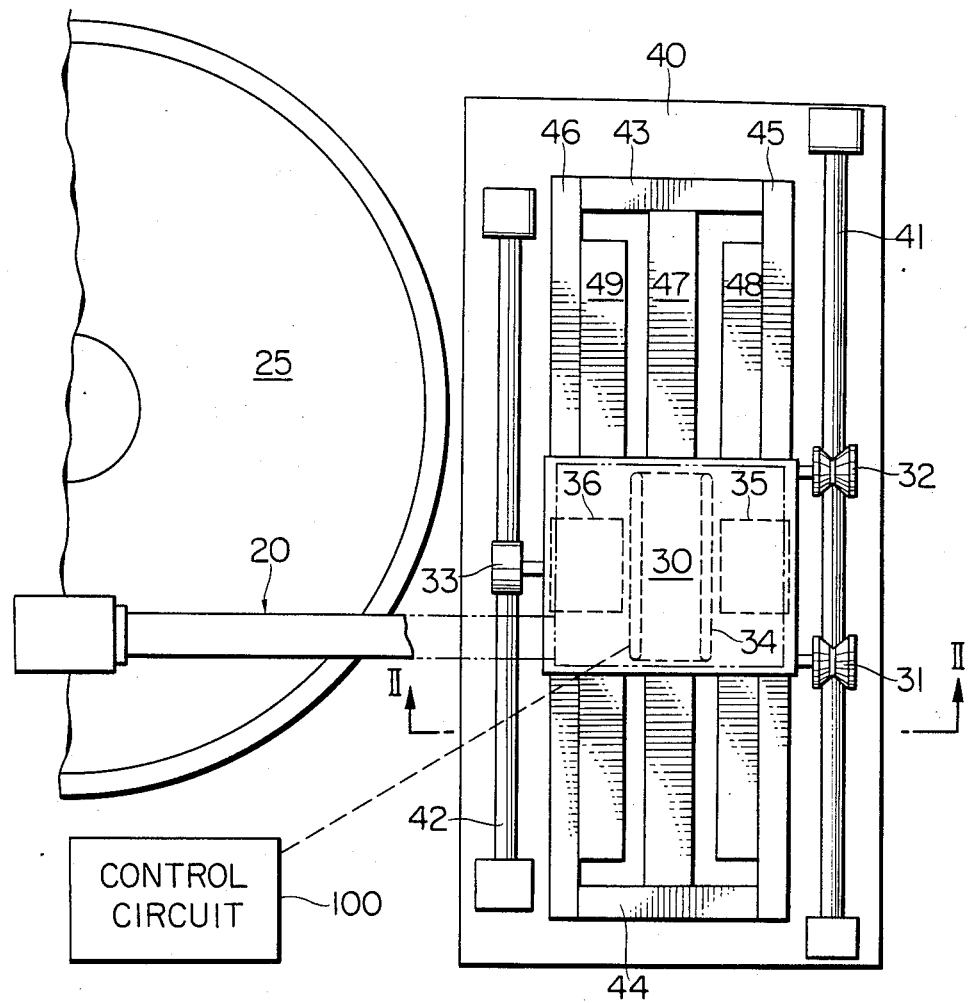

Referring to FIGS. 2 and 3 showing a tracking device for an optical head according to the present invention, two rollers 31, 32 each having a V-shaped groove on its peripheral surface, and a roller 33 are axially supported on a slider 30 which carries an optical head 20. Optical head 20 has at its distal end part a light ray emitting section and a light ray receiving section. The V-shaped groove of each of the rollers 31, 32 is engaged with a guide rail 41 the ends of which are supported on a main body 40 of the device by respective supporting members. The roller 33 is mounted on another guide rail 42 provided in parallel with the guide rails 41 and similarly having its ends supported by supporting members. It is preferable that the surface of each roller and guide rail be finished with the maximum possible precision. Five yokes 43, 44, 45, 46 and 47 which are integrally assembled to one another are fixed on the main body of the device. The assembly of these yokes is arranged in such a manner that a rectangular frame is formed, in which the yokes 43 and 44 are parallel, and the yokes 45 and 46 are also parallel to each other, while the yoke 47 is positioned intermediate the yokes 45 and 46, in parallel with them and with its ends being fixed to the yokes 43 and 44. A permanent magnet 48 is fixed along the inner longitudinal surface of the yoke 45 and spaced from the yoke 47, while another permanent magnet 49 is fixed along the inner longitudinal surface of the yoke 46 and spaced from yoke 47. The yokes 43, 44, 45, 47 and the magnet 48 constitute another magnetic circuit, while the yokes 43, 44, 46 47 and the magnet 49 constitute another magnetic circuit.

To the lower surface of the slider 30, there is fixed a winding 34 in such a manner that it surrounds the center yoke 47. In addition, two highly permeable planar members 35 and 36 made of soft steel plate are fixed to the lower surface of the slider at positions opposing the yoke 45 and magnet 48, and the yoke 46 and magnet 49, respectively, on both sides of the winding 34. The planar member 35 and the assembly of the yoke 45 and the magnet 48 face each other with a certain space gap between them, in which gap a leakage magnetic flux $\phi$ is generated. In the same way, a leakage magnetic flux $\phi$ is also generated in a space gap between the planar member 36 and the assembly of the yoke 46 and the magnet 49. The term leakage magnetic flux as used herein is intended to refer to magnetic flux other than the principal magnetic flux used for the linear motor. In the illustrative embodiment, the magnetic flux to be generated between the yoke 47 and each of the magnets 48 and 49 opposing the yoke is used for the linear motor.

By conduction of direct current through the winding 34 from a control circuit 100 mounted on the slider, the driving magnetic circuit becomes actuated, and the magnetic flux density acting on the winding from the north pole surface of the permanent magnets 48, 49 generates a thrust force, whereby the winding 34 linearly moves along the guide rails 41, 42 together with the slider 30. At the same time, the optical head 20 is tracked over the surface of the recording disc 25 in a radial direction to record or reproduce image information, etc. to or from the recording region of the disc by means of a laser beam from the optical head. During information reproduction, the slider 30 having the optical head installed thereon performs high speed searching operations, in which it quickly retrieves and reproduces signals, for example, of designated picture numbers.

During tracking movement, the slider 30 is maintained horizontally stable (to the left and right in FIGS. 2 and 3) by the engagement of the V-shaped grooves of rollers 31,32 with guide rail 41. Additionally, slider 32 is maintained vertically stable due to the action of the leakage magnetic flux which provides an attractive force between the slider and the frame assembly.

By the aforedescribed construction, the number of the constituent parts to be finished precisely is decreased to provide a simple construction of the device, on acount of which the weight of the slider is reduced and its inertial mass becomes small, with a consequent improvement in response of the slider. Further, the frictional resistance against the movement of the slider is extremely small, because the contact surface between the guide rails and the rollers is small.

Figure 4:
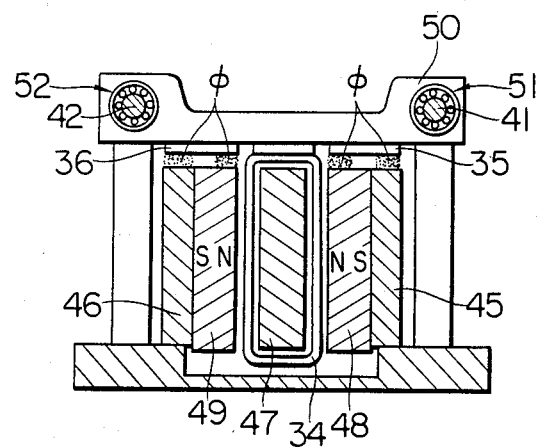
FIG. 4 is a cross-sectional view of another embodiment of the slider according to the present invention.

To permit movement of the slider on and along the guide rails, there may also be used ball bushings as shown in FIG. 4 in place of the rollers. In more detail, two ball bushes 51, 52 are set within the body of a slider 50, and the guide rails 41 and 42 are passed through the respective ball bushes. The difference between the inner diameter of the bore in each ball bush and the outer diameter of the associated guide rail is so small that the guide rail should be finished with high precision. By the magnetic action of the leakage magnetic flux $\phi$ between the high permeability members 35, 36 and the assemblies of the yokes and the magnets 45, 48 and 46, 49, the ball bushings 51, 52 are urged against the guide rails 41, 42, whereby pressure is generated. This pressure increases rigidity at the points of contact between each ball bushing and guide rail, and further increases the resonance frequency, whereby vibration of the slider is prevented, enhancing both its vertical and horizontal stability.

Figure 5:
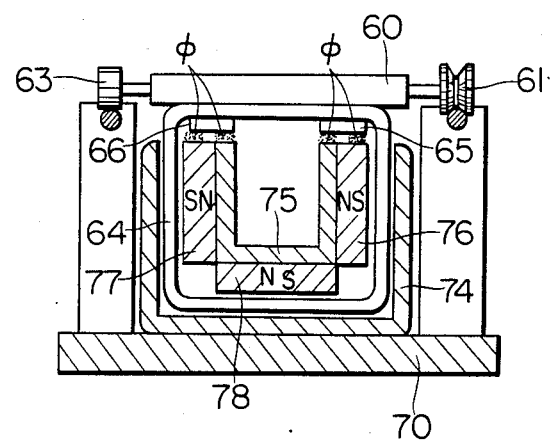
FIG. 5 is a cross-sectional view showing a modification in the construction of the linear motor.

The following embodiment in FIG. 5 is different from the previous one in respect of the construction of the linear motor.

A slider 60 has a winding 64 wound in a relatively large diameter, one part of which is fixed on the lower surface of the slider, with soft steel plates 65, 66 being fixed to the slider through the winding. At both the exterior and interior of the winding, there are fixedly provided on the main body 70 yokes 74, 75, both having a U-shaped cross-section, in parallel relationship to each other. The yoke 75 is a channelling material which passes through the inside of the winding 64, and permanent magnets 76, 77, 78 are fixed on the three surfaces of the yoke in opposition to the winding. During passage of electric current through the winding, there is generated a thrust force, whereby the winding linearly moves along the yoke 74 and the magnets 76, 77, 78 without contacting them. At this time, the leakage magnetic flux $\phi$ generated from the assembly of the inner yoke 75 and the magnets 76, 77 attracts the soft steel plates 65, 66, whereby stability of the slider 60 is secured.

Figure 6:
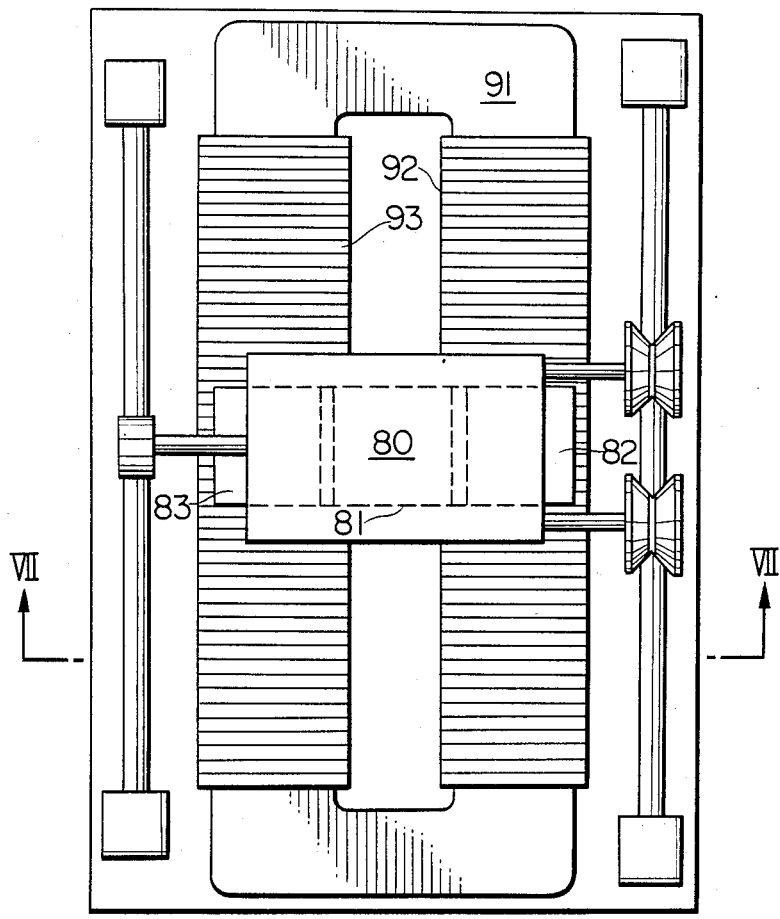
FIG. 6 is a plan view of another modified embodiment of the linear motor.
Figure 7:
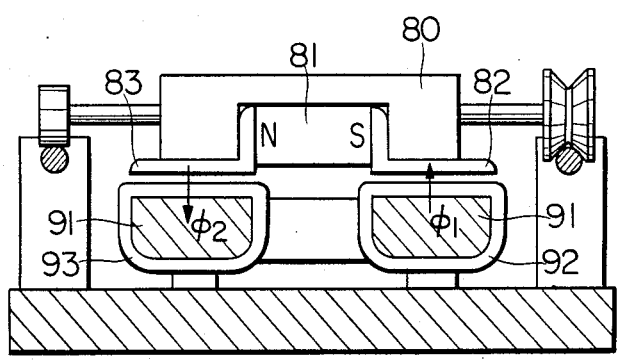
FIG. 7 is a cross-sectional view taken along a line VII—VII in FIG. 6.

FIGS. 6 and 7 illustrate a modified embodiment of the linear motor. In this modified embodiment, a permanent magnet is fixedly provided on the slider, in place of the winding, and windings wound around the yokes are provided below the lower surface of the slider at its opposite sides, thereby constructing the linear motor.

On the lower surface of the slider 80, there is formed a recess as shown in FIG. 7, in which the permanent magnet 81 is fixed. Two soft steel plates 82, 83 have parts respectively joined to the opposite poles of the magnet. The soft steel plates 82, 83 are bent in the shape of a letter "L" along the lower surface of the slider. The yokes 91 are formed in the shape of a letter "O", around which windings 92, 93 are wound. Thus a magnetic circuit is constructed with these elements 81 to 83 and 91 to 93. Magnetic fluxes $\phi_1$ and $\phi_2$ are respectively generated between the soft steel plate 82 and the underlying yoke as well as the soft steel plate 83 and its underlying yoke.

When direct current is caused to flow through the winding in such construction as mentioned above, the slider 80 moves linearly along the guide rails by the action of the magnetic fluxes $\phi_1$ and $\phi_2$. Also, the slider 80 is attracted downward by the magnetic action among the magnet 81, the soft steel plate 82 and the yoke 91 as well as the magnetic action among the magnet 81, the soft steel plate 83 and the yoke 91, whereby its stability in the vertical direction can be maintained.

We claim:

1. Apparatus for tracking a movable body along a linear path parallel to a plane, comprising
   (a) means for supporting said body for movement parallel to said plane, said supporting means including guide means for guiding said body along said linear path and means for mounting said body for movement on said guide means,
   (b) linear motor means mounted on said support means for driving said body along said linear path, said linear motor means including electromagnet winding means to which direct current is applied and permanent magnet means, with one of said magnet means and said winding means being attached to said supporting means and the other of said magnet means and said winding means being fixed to said body, said magnet means and said winding means being disposed relative to one another such that the application of direct current to said winding means generates a thrust force tending to drive said body along said linear path, and
   (c) means for magnetically urging said mounting means against said guide means in a direction normal to said plane.

2. Apparatus according to claim 1, wherein said guide means includes a pair of guide rails extending in the direction of said linear path, and wherein said mounting means includes first roller means supported by said body for rolling on and along one of said guide rails and second roller means supported by said body for rolling on and along the other of said guide rails, saif first roller means including at least one roller having a groove formed in the outer peripheral surface thereof and fittingly engaged with said one of the guide rails.

3. Apparatus according to claim 1, wherein said guide means includes a pair of guide rails extending in the direction of said linear path, and wherein said mounting means includes a pair of ball bushing means supported in said body with each bushing means having a respective one of said guide rails passing axially therethrough.

4. Apparatus according to claim 1, wherein said winding means is fixed on said body, and wherein said linear motor means includes yoke means fixedly disposed with respect to said supporting means and having a portion which extends through said winding means, said permanent magnet means being disposed outside said winding means, opposite to said portion of said yoke means, and being fixed with respect to said supporting means.

5. Apparatus according to claim 1, wherein said winding means is fixed on said body, and wherein said linear motor means includes yoke means fixedly disposed with respect to said supporting means and having a portion extending in the direction of said linear path outside said winding means, said permanent magnet means being disposed inside said winding means, opposite to said portion of the yoke means, and being fixed with respect to said supporting means.

6. Apparatus according to claim 1, wherein said urging means includes at least one member of high magnetic permeability attached to said body, and a magnetic circuit including said member and through which a magnetic flux passes which is separate from a principal magnetic flux used for generating said thrust force in said linear motor means.

7. Apparatus according to claim 6, wherein said linear path extends in a horizontal direction and wherein said high permeability member is fixed to a bottom surface of said body.

8. Apparatus according to claim 6, wherein said linear motor means includes yoke means fixed to said supporting means and forming a rectangular frame with long sides extending in the direction of said linear path, wherein said permanent magnet means includes a pair of permanent magnets attached to opposite inner surfaces of said long sides of said frame, wherein said winding means includes a winding fixed to said body and extending into the interior of said frame in spaced relation to said permanent magnets, said yoke means further including a yoke member extending across the interior of said frame in the direction of said linear path and passing through said winding, and wherein said urging means includes two of said members at high magnetic permeability attached to said body at opposite sides of said winding, each member having a portion facing a respective long side of said frame and the permanent magnet attached to that long side.

9. Apparatus according to claim 6, wherein said linear motor means includes yoke means having a first portion of U-shaped cross section extending in the direction of said linear path and a second portion of U-shaped cross section supported within said first portion, with outer surfaces of sides of said second portion facing and spaced from inner surfaces of corresponding sides of said first portion, wherein said permanent magnet means is attached to said outer surfaces and spaced from said inner surfaces, wherein said winding means includes a winding fixed to said body, with said second portion of said yoke means and said permanent magnet means extending through said winding, and wherein said urging means includes two of said members of high permeability attached to said body and disposed internally of said winding at spaced positions adjacent opposite sides of said second portion of said yoke means.

10. Apparatus according to claim 1, wherein said permanent magnet means is fixed to said body and wherein said linear motor means includes yoke means fixed with respect to said supporting means and having respective portions extending in the direction of said linear path adjacent opposite sides of said body, said winding means including windings respectively wound on said portions of said yoke means.

11. Apparatus for tracking an optical head and the like along a radius of a planar recording disc, comprising (a) a movable body having said optical head and the like attached thereto, (b) means for supporting said body for movement in a plane parallel to said disc, said supporting means including guide means for guiding said body along a linear path parallel to said radius of said disc and means for mounting said body for movement on said guide means, (c) linear motor means mounted on said support means for driving said body along said linear path, said linear motor means including electromagnet winding means to which direct current is applied and permanent magnet means, with one of said magnet means and said winding means being attached to said supporting means and the other of said magnet means and said winding means being fixed to said body, said magnet means and said winding means being disposed relative to one another such that the application of direct current to said winding means generates a thrust force tending to drive said body along said linear path, and (d) means for magnetically urging said mounting means against said guide means in a direction normal to said plane.

* * * * *